Aug. 24, 1926.
F. W. HOFFMAN
GRADE METER
Filed June 4, 1925
1,596,877
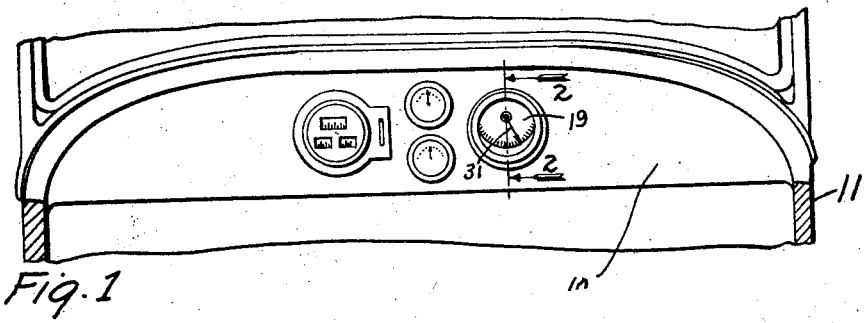
Fig. 1
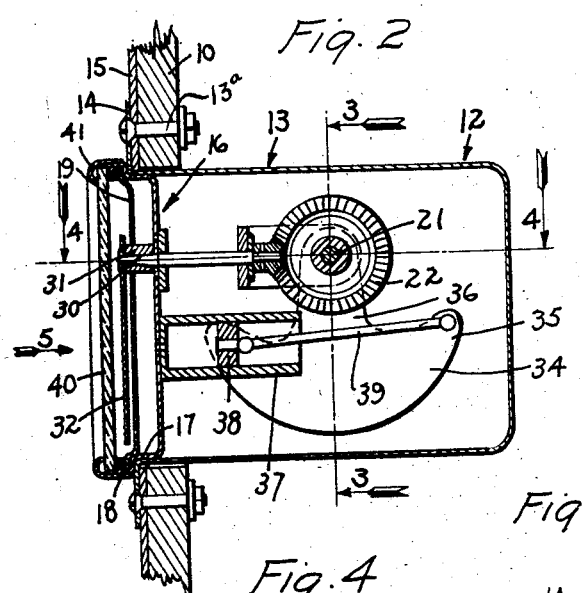
Inventor
Fred. W. Hoffman
by: Hazard and Miller
Attys.

Patented Aug. 24, 1926.

1,596,877

UNITED STATES PATENT OFFICE.

FRED W. HOFFMAN, OF REDONDO BEACH, CALIFORNIA.

GRADE METER.

Application filed June 4, 1925. Serial No. 34,809.

This invention relates to automobile accessories.

The object of this invention is to provide a grade meter adapted to be mounted on the instrument board of an automobile.

Another object of the invention is to provide a grade meter which is not affected by the vibration or rocking of the automobile caused by the undulations in the road.

These objects are obtained by the disclosure herein set forth by the following description of the accompanying drawings, illustrating a practical embodiment of the invention, the novel features hereof being pointed out in the appended claim, in which;

Figure 1 is a fragmentary sectional elevation through the driver's compartment of a motor vehicle, showing the instrument board with the grade meter thereon.

Fig. 2 is a vertical section taken through the instrument board and grade meter, on line 2—2 of Fig. 1.

Fig. 3 is a transverse section of the grade meter taken on line 3—3 of Fig. 2.

Fig. 4 is a horizontal section of the grade meter taken on line 4—4 of Fig. 2.

Fig. 5 is a fragmentary front elevation of the instrument board with the grade meter thereon.

Referring by numerals to the accompanying drawings, 10 designates an instrument board of an automobile indicated at 11, upon which the grade meter indicated at 12 is adapted to be mounted.

The grade meter consists of a casing 13, which is substantially cylindrical in shape, and extends through an opening in the instrument board 10. An annular flange 14 is formed on the outer end of the casing 13 and engages an annulus 15 resting on the front side of the instrument board 10. The casing is held in place on the instrument board by bolts 13ª.

A supporting plate indicated at 16 has an annular extension 17, terminating in a cylinder 18, and is mounted in the end of the casing 13 and dial plate 19 is carried by the plate 16.

A bracket indicated at 20 is secured to the plate 16 and is adapted to support a stud shaft 21, upon which is mounted a bevel gear 22, having hubs 23 and 24. The stud shaft has a head 25 engaging the hub 24 and is held in place by lock nuts 26.

An indicator shaft 27 extends through an opening 28 formed in the bracket 20 and a bevel gear 29 meshing with the bevel gear 22 is fixed to one end of the shaft 27. The outer end of the shaft 27 is tapered as indicated at 30 and is adapted to receive a head 31, upon which is mounted an indicator 32, which is adapted to register with a graduating scale indicated at 33, formed on the outer side of the plate 19.

A balance weight 34, is formed on the hub 23 and has an arcuate portion 35, formed on an arm 36 depending from the hub 23 of the gear 22. Means are provided for preventing movement of the balance weight due to jostling or vibration of the motor vehicle and consists of a cylinder 37 in which is mounted a plunger 38 which is connected to the outer end of the portion 35 of the balance weight by a link 39.

A glass plate 40 is mounted on the forward end of the plate 19 and is held in place by a ring 41.

From the construction it will be seen that the balance weight remains in a perpendicular plane and as the motor vehicle ascends a grade, the gear 29 will be moved upwardly on the gear 22, which in turn will cause the indicator 32 to move in the direction indicated by the arrow 42. When the automobile is descending a grade, the gear 29 will move downwardly on the gear 22 and cause the indicator 32 to move in the direction indicated by the arrow 43.

It will be noted that the head 31, carrying the indicator 32 may be radially adjusted, this being necessary in the event that the indicator is placed on a slanting instrument board.

From the construction it will be seen that the grade meter is very simple in construction and may be easily and cheaply produced and will accurately register any grade which an automobile may encounter.

Various changes may be made without departing from the spirit of the invention as claimed.

What is claimed is:

A grade meter comprising in combination a substantially cylindrical casing having an annular flange adapted to be secured to an instrument board, a supporting plate having an annular extension terminating in a cylindrical portion, mounted in one end of the casing, a dial plate carried by the supporting plate and in front thereof, a glass in front of the dial plate, a ring securing said glass to the cylindrical extension of the supporting plate, a bracket attached to the supporting plate inside the casing, a transverse stub shaft rigidly attached to the bracket, an integral bevel gear and balance weight rotatably mounted on the stub shaft, an indicator shaft journaled in the bracket and in the supporting plate, an indicator attached to said shaft between the dial plate and the glass, a bevel pinion on the inner end of the indicator shaft, meshing with the bevel gear, a cylinder attached to the inner face of the supporting plate, a plunger therein and a link connecting the plunger to the balance weight.

In testimony whereof I have signed my name to this specification.

FRED W. HOFFMAN.